United States Patent
Chen et al.

(10) Patent No.: US 12,334,275 B2
(45) Date of Patent: Jun. 17, 2025

(54) NEGATIVE-PRESSURE PACKAGING METHOD FOR ALUMINUM ELECTROLYTIC CAPACITOR

(71) Applicant: CAPXON ELECTRONIC TECHNOLOGY CO., LTD, Shenzhen (CN)

(72) Inventors: Qirui Chen, Shenzhen (CN); I-Chu Lin, Taiwan (CN); Jiaxian Luo, Shenzhen (CN)

(73) Assignee: CAPXON ELECTRONIC TECHNOLOGY CO., LTD, Shenzhen (CN)

( * ) Notice: Subject to any disclaimer, the term of this patent is extended or adjusted under 35 U.S.C. 154(b) by 431 days.

(21) Appl. No.: 17/969,549

(22) Filed: Oct. 19, 2022

(65) Prior Publication Data
US 2023/0038905 A1 Feb. 9, 2023

(30) Foreign Application Priority Data
May 11, 2022 (CN) .......................... 202210509505.5

(51) Int. Cl.
*H01G 9/00* (2006.01)
*H01G 9/10* (2006.01)
*H01G 9/06* (2006.01)
*H01G 9/08* (2006.01)

(52) U.S. Cl.
CPC ............ *H01G 9/0029* (2013.01); *H01G 9/10* (2013.01); *H01G 9/06* (2013.01); *H01G 9/08* (2013.01)

(58) Field of Classification Search
None
See application file for complete search history.

(56) References Cited

U.S. PATENT DOCUMENTS
9,786,441 B2   10/2017   Lin et al.

FOREIGN PATENT DOCUMENTS

| CN | 206271563 U | * | 6/2017 | ............. H01G 13/00 |
| CN | 106816318 B | * | 2/2019 | ........... H01G 13/003 |
| CN | 110880418 A | * | 3/2020 | ............. H01G 13/00 |
| CN | 111755252 A | * | 10/2020 | ............... H01G 9/08 |
| CN | 112466666 A | * | 3/2021 | ............. H01G 13/00 |
| DE | 10210110 A1 | * | 9/2003 | ............. H01G 9/035 |
| JP | 08236407 A | * | 9/1996 | ............... H01G 9/10 |

* cited by examiner

*Primary Examiner* — Scott B Geyer

(57) ABSTRACT

A negative-pressure packaging method for aluminum electrolytic capacitors including: penetratedly arranging a capacitor element in a seal; placing the capacitor element, the seal and a case at an inner chamber of an accommodating mechanism; sealing the accommodating mechanism; vacuumizing the accommodating mechanism to allow the inner chamber to be in a negative pressure state; subjecting the seal and the case to packaging, such that the seal is located at a first depth of the case; and subjecting the seal and the case to pressing, such that the seal is located at a second depth of the case, where the second depth is closer to a bottom of the case with respect to the first depth.

10 Claims, 8 Drawing Sheets

NEGATIVE-PRESSURE PACKAGING METHOD FOR ALUMINUM ELECTROLYTIC CAPACITOR

CROSS-REFERENCE TO RELATED APPLICATIONS

This application claims the benefit of priority from Chinese Patent Application No. 202210509505.5, filed on May 11, 2022. The content of the aforementioned application, including any intervening amendments thereto, is incorporated herein by reference in its entirety.

TECHNICAL FIELD

This application relates to capacitors, and more particularly to a negative-pressure packaging method for an aluminum electrolytic capacitor.

BACKGROUND

The conventional aluminum electrolytic capacitors are usually packaged at normal pressure, but this packaging method will lead to a shorter service life, failing to satisfy the requirements of current electronics. In the actual production of aluminum electrolytic capacitors, an opening of the case is sealed by a seal, so that an inner cavity of the case is in a closed state. When the seal is squeezed into the opening of the case, the seal has a large tension, and thus there is a great frictional force when the seal slides relative to the case.

In the prior art, the seal is directly slid to the opening of the case in one time, so that the seal will experience a long sliding distance at an inner wall of the opening, and a large amount of heat will be generated due to the friction between the inner wall of the opening and the seal. The heat will slightly melt the seal, and further cause the shrinkage of the seal, reducing the structure airtightness. Therefore, the existing manufacturing methods fail to obtain aluminum electrolytic capacitors with high external airtightness and internal negative pressure.

SUMMARY

An object of this application is to provide a negative-pressure packaging method for an aluminum electrolytic capacitor to overcome the defects in the prior art that the reliable airtight sealing between the seal and the case is difficult to achieve due to the shrinkage of the seal.

Technical solutions of the disclosure are described as follows.

This application provides a negative-pressure packaging method for an aluminum electrolytic capacitor, comprising:
  (S100) penetratedly arranging a capacitor element in a seal;
  (S200) placing the capacitor element, the seal and a case at an inner chamber of an accommodating mechanism; and sealing the accommodating mechanism;
  (S300) vacuumizing the accommodating mechanism to allow the inner chamber to be in a negative pressure state;
  (S400) packaging the seal and the case, such that the seal is located at a first depth of the case; and
  (S500) subjecting the seal and the case to pressing to allow the seal to be located at a second depth of the case, wherein the second depth is closer to a bottom of the case with respect to the first depth.

In some embodiments, step (S200) comprises:
  (S210) placing the capacitor element, the seal and the case at the inner chamber of the accommodating mechanism, wherein the accommodating mechanism has a first open end and a second open end opposite to the first open end; and
  (S220) moving a first cover towards the first open end to seal an opening at the first open end; and moving a second cover towards the second open end to seal an opening at the second open end, such that the accommodating mechanism is sealed.

In some embodiments, step (S400) comprises:
  (S410) penetratedly arranging a first pressing rod in the first cover; and driving, by the first pressing rod, the seal to press towards the case; and
  (S420) penetratedly arranging a second pressing rod in the second cover; and driving, by the second pressing rod, the case to press towards the seal to allow the seal to be located at the first depth of the case.

In some embodiments, step (S410) comprises:
  (S411) penetratedly arranging the first pressing rod in the first cover; and driving, by the first pressing rod, the seal to move towards the case to seal the case;
  (S412) switching the negative pressure state of the inner chamber of the accommodating mechanism to an atmospheric pressure state; and
  (S413) applying, by the first pressing rod, a force towards the bottom of the case to the seal to drive the seal to be located at the first depth of the case.

In some embodiments, the negative-pressure packaging method further comprises:
  (S501) before step (S500), when the seal is located at the first depth of the case, moving the first pressing rod and the first cover in a direction away from the seal; and moving the second pressing rod and the second cover in a direction away from the case; and
  (S502) transporting the accommodating mechanism to a next pressing position.

In some embodiments, step (S500) comprises:
  (S510) sealing the opening at the first open end of the accommodating mechanism with a third cover, and sealing the opening at the second open end of the accommodating mechanism with a fourth cover, such that the accommodating mechanism is sealed;
  (S520) penetratedly arranging a first pressing rod in the third cover; and driving, by the first pressing rod, the seal to press towards the case; and
  (S530) penetratedly arranging a second pressing rod in the fourth cover; and driving, by the second pressing rod, the case to press towards the seal to locate the seal at the second depth of the case.

In some embodiments, step (S520) further comprises:
switching the negative pressure state of the inner chamber of the accommodating mechanism to an atmospheric pressure state.

In some embodiments, step (S500) further comprises:
  (S600) subjecting the seal and the case to another pressing to locate the seal at a third depth of the case, wherein the third depth is closer to the bottom of the case with respect to the second depth.

In some embodiments, step (S600) comprises:
  (S610) sealing the opening at the first open end of the accommodating mechanism with a first cover, and sealing the opening at the second open end of the accommodating mechanism with a second cover, such that the accommodating mechanism is sealed;

(S620) penetratedly arranging a first pressing rod in the first cover; and driving, by the first pressing rod, the seal to press towards the case; and (S630) penetratedly arranging a second pressing rod in the second cover; and driving, by the second pressing rod, the case to press towards the seal to locate the seal at a third depth of the case.

In some embodiments, step (S600) further comprises:

performing tightening surrounding a to-be-sealed portion of the case.

Compared to the prior art, this application has the following beneficial effects.

Regarding the negative-pressure packaging method provided herein, a capacitor element is penetratedly arranged in a seal. The capacitor element, the seal and a case are arranged at an inner chamber of an accommodating mechanism, and then the accommodating mechanism is sealed and vacuumized to allow the inner chamber to be under a negative pressure state. The seal and the case are subjected to packaging, such that the seal is located at a first depth of the case. The seal and the case are subjected to pressing, such that the seal is located at a second depth of the case, where the second depth is closer to a bottom of the case with respect to the first depth. In consequence, the defect in the prior art that the sliding distance of the seal on the inner wall of the case is too long is overcome, reducing the generation of friction heat, and preventing the melting of the seal. Therefore, the packaging method provided herein can ensure a reliable air tight seal between the seal and the case, improving the product stability and service life.

BRIEF DESCRIPTION OF THE DRAWINGS

Technical solutions of the present disclosure and the prior art will be described below with reference to the accompany drawings to facilitate the understanding. Obviously, presented in the accompany drawings are merely some embodiments of the present disclosure, and other accompany drawings can be obtained by those skilled in the art based on the drawings provided herein without paying creative effort.

Figure 1:
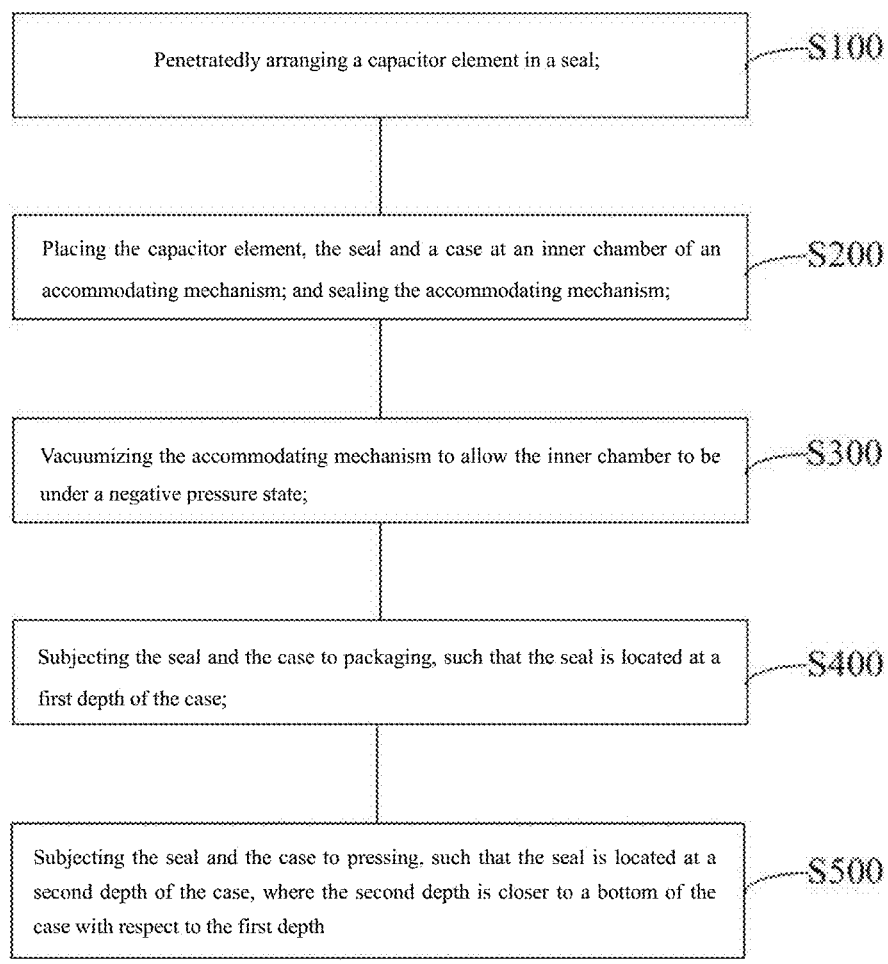
FIG. 1 is a flow chart of a negative-pressure packaging method for aluminum electrolytic capacitors according to an embodiment of the present disclosure.

In the drawings: 1, accommodating mechanism; 2, first pressing rod; 3, first cover; 4, second pressing rod; 5, second cover; 6, third pressing rod; 7, third cover; 8, fourth pressing rod; 9, fourth cover; 10, fifth pressing rod; 11, fifth cover; 12, sixth pressing rod; 13, sixth cover; 14, capacitor element; 15, seal; and 16, cases.

The objectives, technical solutions and beneficial effects of the present disclosure will be further described below with reference to the accompanying drawings and embodiments.

DETAILED DESCRIPTION OF EMBODIMENTS

Technical solutions of the present disclosure will be clearly and completely described below with reference to the embodiments and accompanying drawings. Obviously, described below are merely some embodiments of this disclosure, and are not intended to limit the disclosure. Other embodiments obtained by those skilled in the art based on the embodiments provided herein without paying any creative effort should fall within the scope of the present disclosure.

It should be noted that as used herein, directional indications, such as "up", "down", "left", "right", "front" and "back", are merely intended to explain a relative positional relationship and movement between components in a specific posture, and if the specific posture changes, the directional indication changes accordingly. In addition, terms, such as "first" and "second", are illustrative, and should not be understood as indicating or implying a relative importance or the number of elements. Elements defined with "first" and "second" may explicitly or implicitly include at least one of the element. Besides, the "and/or" used herein includes three solutions, for example, "A and/or B" includes A, B and a combination thereof. Additionally, technical solutions of various embodiments can be combined on the premise that the combined technical solution can be implemented by those skilled in the art. When the combination of technical solutions is contradictory or cannot be implemented, such a combination does not exist, and does not fall within the scope of the present disclosure.

As shown in FIG. 1, a negative-pressure packaging method for aluminum electrolytic capacitors includes the following steps.

(S100) A capacitor element 14 is penetratedly arranged in a seal 15.

(S200) The capacitor element 14, the seal 15 and a case 16 are placed at an inner chamber of an accommodating mechanism 1. The accommodating mechanism 1 is sealed.

(S300) The inner chamber of the accommodating mechanism 1 is vacuumized to allow the inner chamber to be in a negative pressure state.

(S400) The seal 15 and the case 16 are packaged, such that the seal 15 is located at a first depth of the case 16.

(S500) The seal 15 and the case 16 are subjected to pressing to allow the seal 15 to be located at a second depth of the case 16. The second depth is closer to a bottom of the case 16 with respect to the first depth.

By means of the method provided herein, the seal 15 is firstly located at the first depth, and then pressed to the second depth, avoiding experiencing a long sliding distance of the seal 15 at an inner wall of the case 16, and preventing a slight melting at a friction surface of the seal 15 due to overheating. Therefore, an outer diameter of the seal 15 is prevented from shrinkage, ensuring an airtightness between the seal 15 and the case 16.

During operation, the aluminum electrolytic capacitor generates heat, which affects the seal 15 and make it slightly shrinks. In consequence, a gap is generated between the seal 15 and the case 16. The dielectric medium inside the aluminum electrolytic capacitor evaporates, and the mass of electrolyte decreases, leading to a shorter service life of the aluminum electrolytic capacitor. The capacitor element 14 generates heat during operation. In an atmospheric pressure state, the heat leads to expanded gas, while no expanded gas generates in a negative pressure state. Thus, the service life of the aluminum electrolytic capacitor is longer when packaging in a negative pressure state. By means of the negative-pressure packaging method, the case 16 is in the negative pressure state, and the mass of the electrolyte will not decrease, leading to a longer service life of the aluminum electrolytic capacitor.

Specifically, the case 16 is made by aluminum, that is, a cylindrical part is made by aluminum through casting or stamping. The seal 15 is a rubber plug and is cylindrical. The outer diameter of the seal 15 is greater than an inner diameter of the case 16. The seal 15 is fixedly connected to the capacitor element 14 to form a stepped surface. The stepped surface abuts against the case 16, such that the case 16 and the seal 15 form a negative-pressure sealed chamber. The capacitor element 14 is cylindrical wrapped by an electrolytic aluminum foil, a guide pin and an electrolytic paper.

In an embodiment, the aluminum electrolytic capacitor includes the case 16, the capacitor element 14, the seal 15 and the dielectric medium. The seal 15 is fixedly connected to the capacitor element 14 to form the stepped surface. The stepped surface abuts against the case 16, such that the case 16 and the seal 15 can form a sealed chamber. The dielectric medium is provided inside the sealed chamber. The capacitor element 14 is arranged inside the dielectric medium. Specifically, air in the sealed chamber is pumped out before the stepped surface abuts against the case 16 to allow the sealed chamber becoming a negative-pressure sealed chamber. A pressure of the negative-pressure sealed chamber is lower than atmospheric pressure. In an embodiment, the seal 15 and the case 16 are cylinder, and the outer diameter of the seal 15 is greater than the inner diameter of the case 16.

In an embodiment, step (S200) includes the following steps.
(S210) The capacitor element 14, the seal 15 and the case 16 are placed at the inner chamber of the accommodating mechanism 1, where the accommodating mechanism 1 has a first open end and a second open end opposite to the first open end.
(S220) A first cover 3 is moved towards the first open end to seal an opening at the first open end. A second cover 5 is moved towards the second open end to seal an opening at the second open end, such that the accommodating mechanism 1 is sealed.

Specifically, step (S400) includes the following steps.
(S410) A first pressing rod 2 is penetratedly arranged in the first cover 3. The seal 15 is driven by the first pressing rod 2 to press towards the case 16.
(S420) A second pressing rod 4 is penetratedly arranged in the second cover 5. The case 16 is driven by the second pressing rod 4 to press towards the seal 15 to allow the seal 15 to be located at the first depth of the case 16.

Specifically, step (S410) includes the following steps.
(S411) The first pressing rod 2 is penetratedly arranged in the first cover 3. The seal 15 is driven by the first pressing rod 2 to press towards the case 16 to seal the case 16.
(S412) The negative pressure state of the inner chamber of the accommodating mechanism 1 is switched to an atmospheric pressure state.
(S413) The first pressing rod 2 applies a force towards the bottom of the case 16 to the seal 15, so as to drive the seal 15 to be located at the first depth of the case 16.

The seal 15 and the case 16 are packaged at the negative pressure state, that is, the seal 15 partially enters the case 16. An inner chamber of the case 16 is sealed under the negative pressure state. At this time, the inner chamber of the accommodating mechanism is pumped air to allow the inner chamber at the atmospheric pressure state. A pressure of the inner chamber of the accommodating mechanism is higher than that of the inner chamber of the case 16. Therefore, the seal 15 is driven to press towards the bottom of the case 16. By switching the inner chamber of the accommodating mechanism 1 from the negative pressure state to the atmospheric pressure state, the seal 15 is easily to be pressed at the first depth of the case 16.

In an embodiment, the negative-pressure packaging method further includes the following steps.
(S501) before step (S500), when the seal 15 is located at the first depth of the case 16, the first pressing rod 2 and the first cover 3 are moved in a direction away from the seal 15. The second pressing rod 4 and the second cover 5 are moved in a direction away from the case 16.
(S502) The accommodating mechanism 1 is transported to a next pressing position.

When the seal 15 is located at the first depth of the case 16 and required to enter the next pressing position, the first pressing rod 2, the first cover 3, the second pressing rod 4 and the second cover 5 are detached from the accommodating mechanism 1.

Figure 2:
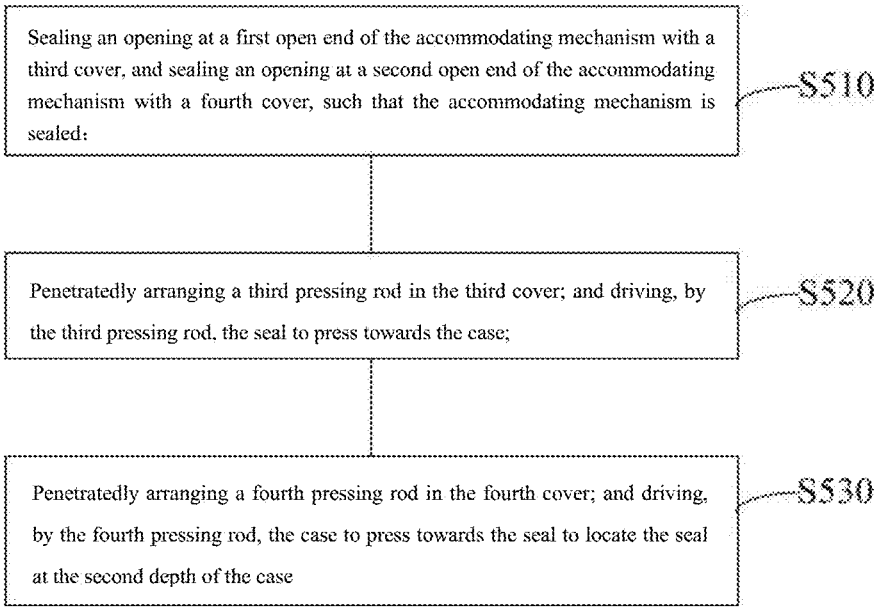
FIG. 2 is a flow chart showing primary pressing for a seal and a case according to an embodiment of the present disclosure.

In an embodiment, as shown in FIG. 2, step (S500) includes the following steps.
(S510) The opening at the first open end of the accommodating mechanism 1 is sealed with a third cover 7. The opening at the second open end of the accommodating mechanism 1 is sealed by a fourth cover 9. Therefore, the accommodating mechanism 1 is sealed.
(S520) A third pressing rod 6 is penetratedly arranged in the third cover 7. The seal 15 is driven by the third pressing rod 6 to press towards the case 16.
(S530) A fourth pressing rod 8 is penetratedly arranged in the fourth cover 9. The case 16 is driven by the fourth pressing rod 8 to press towards the seal 15 to locate the seal 15 at the second depth of the case 16.

In an embodiment, step (S520) further includes the following steps.
(S521) The negative pressure state of the inner chamber of the accommodating mechanism 1 is switched to an atmospheric pressure state. Results of this step are the same as above.

In an embodiment, step (S500) further includes the following steps.
(S600) The seal 15 and the case 16 are subjected to another pressing to locate the seal 15 at a third depth of the case 16. The third depth is closer to the bottom of the case 16 with respect to the second depth.

Referring to FIGS. 4-8, a moving distance of the seal 15 with respect to the case 16 is L. During packaging, the seal 15 is pressed to move L with friction in one time. When the friction is large, the seal 15 is instantly heated up due to friction if it moves L with friction in one time, which will damage the seal 15, such that the airtightness between the seal 15 and the case 16 is affected. By means of a first pressing device and a second pressing device, the seal 15 moves L1 with respect to the case 16 after processed by a packaging device, that is, the seal 15 is located at the first depth of the case 16. Then, the seal 15 is processed by the first pressing device, and the seal 15 further moves L2 with respect to the case 16, that is, the seal 15 is located at the second depth of the case 16. Moreover, the seal 15 is processed by the second pressing device, and the seal 15 further moves L3 with respect to the case 16, that is, the seal 15 is located at the third depth of the case 16. L is the sum of L1, L2 and L3. The seal 15 moves in the case 16 for three times, and a moving distance is shorter than a last moving distance, consequently, the seal 15 is prevented from being damaged by the heat generated from the long-distance friction, ensuring the airtightness between the case 16 and the seal 15.

Figure 3:
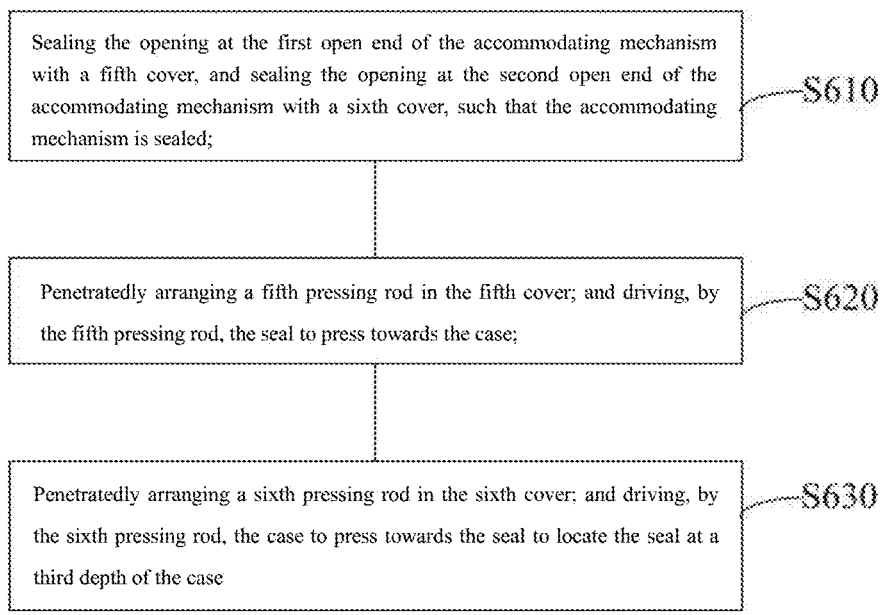
FIG. 3 is a flow chart showing secondary pressing for the seal and the case according to an embodiment of the present disclosure.
Figure 4:
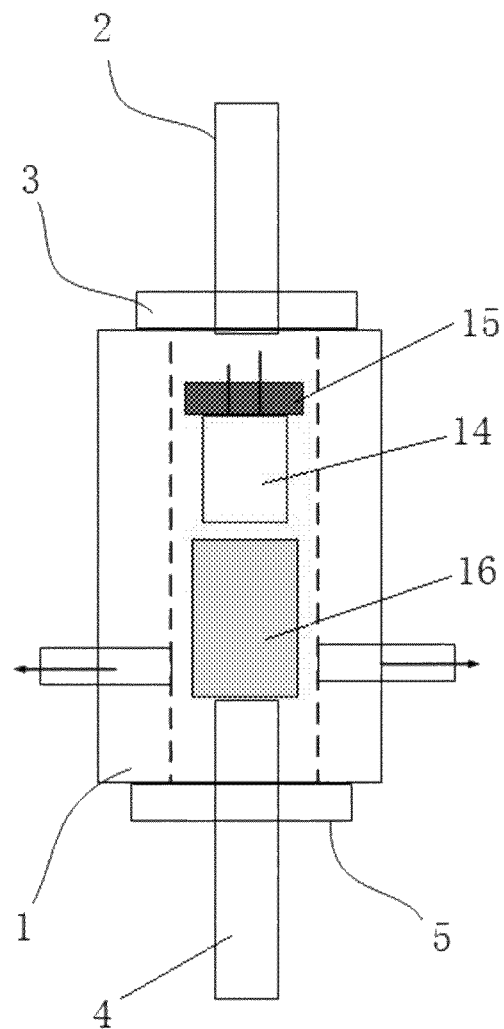
FIG. 4 shows the seal and the case before packaging according to an embodiment of the present disclosure.
Figure 5:
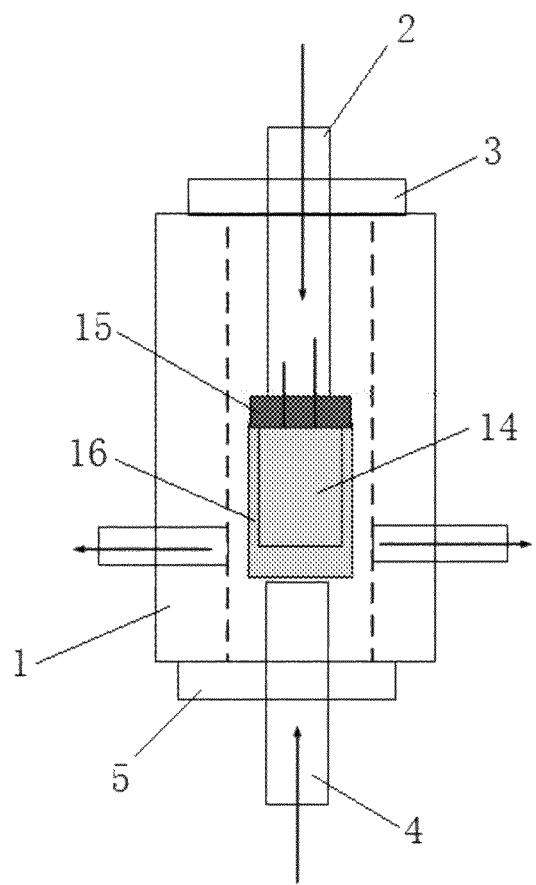
FIG. 5 schematically depicts the seal located at a first depth of the case according to an embodiment of the present disclosure.
Figure 6:
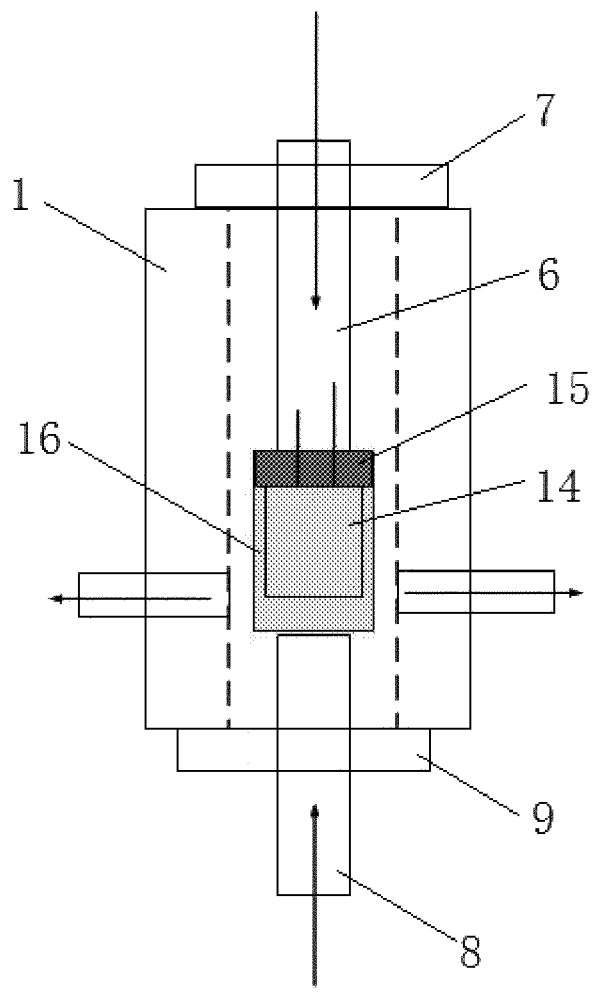
FIG. 6 schematically depicts the seal located at a second depth of the case according to an embodiment of the present disclosure.
Figure 7:
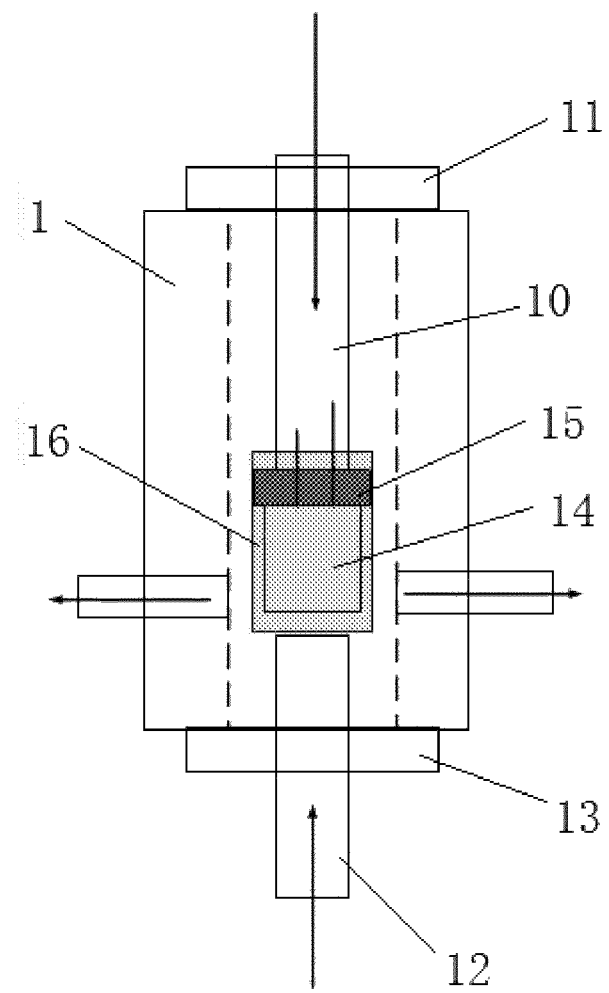
FIG. 7 schematically depicts the seal located at a third depth of the case according to an embodiment of the present disclosure.
Figure 8:
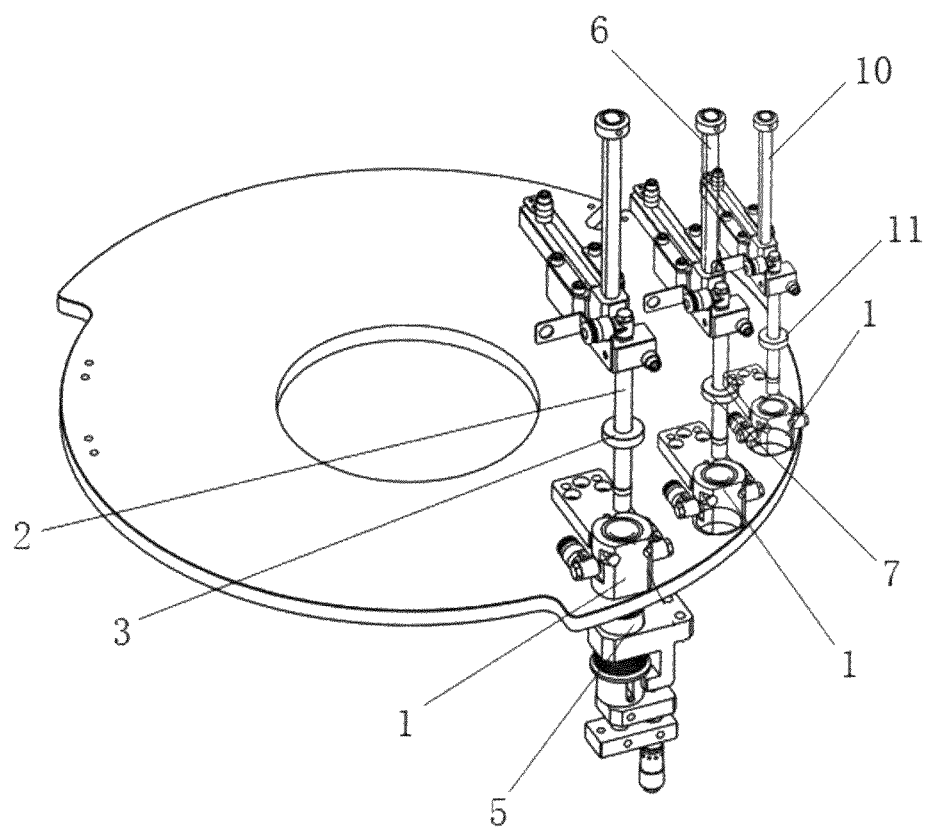
FIG. 8 schematically depicts a negative-pressure packaging device according to an embodiment of the present disclosure.

As shown in FIG. 3, step (S600) includes the following steps.

(S610) The opening at the first open end of the accommodating mechanism 1 is sealed by a fifth cover 11, and the opening at the second open end of the accommodating mechanism 1 is sealed by a sixth cover 13, such that the accommodating mechanism 1 is sealed.

(S620) A fifth pressing rod 10 is penetratedly arranged in the fifth cover 11. The seal 15 is driven by the fifth pressing rod 10 to press towards the case 16.

(S630) A sixth pressing rod 12 is penetratedly arranged in the sixth cover 13. The case 16 is driven by the sixth pressing rod 12 to press towards the seal 15 to locate the seal 15 at the third depth of the case 16.

During operation, the first cover 3 seals the opening at the first open end of the accommodating mechanism 1, and the second cover 9 seals the opening at the second open end of the accommodating mechanism 1, such that the accommodating mechanism 1 is sealed. The accommodating mechanism 1 is vacuumized to allow the accommodating mechanism 1 in the negative pressure state. The first pressing rod 2 drives the seal 15 to press towards the case 16, and the second pressing rod 4 drives the case 16 to press towards the seal 15, such that the seal 15 seals the inner chamber of the case 16. The negative pressure state of the inner chamber of the accommodating mechanism 1 is switched to an atmospheric pressure state. At this time, the inner chamber of the case 16 is in the negative pressure state, and the first pressing rod 2 with the atmospheric pressure can press the seal 15 towards the bottom of the case 16. When the seal 15 is located at the first depth of the case 16, the first pressing rod 2, the first cover 3, the second pressing rod 4 and the second cover 9 move in the direction away from the case, and the accommodating mechanism 1 is transported to a next pressing position.

The third cover 7 seals the opening at the first open end of the accommodating mechanism 1, and the fourth cover 9 seals the opening at the second open end of the accommodating mechanism 1, such that the accommodating mechanism 1 is sealed. The accommodating mechanism 1 is vacuumized to allow the accommodating mechanism 1 in a negative pressure state again. When the third pressing rod 6 drives the seal 16 to press towards the case 16, the negative pressure state of the inner chamber of the accommodating mechanism 1 is switched to an atmospheric pressure state, such that the third pressing rod 6 with atmospheric pressure can press the seal 15 towards the bottom of the case 16. When the seal 15 is located at the second depth of the case 16, the third pressing rod 6, the third cover 7 and the fourth cover 9 move in the direction away from the case, and the accommodating mechanism 1 is transported to a position for the second pressing.

The fifth cover 11 seals the opening at the first open end of the accommodating mechanism 1, and the sixth cover 9 seals the opening at the second open end of the accommodating mechanism 1, such that the accommodating mechanism 1 is sealed. The accommodating mechanism 1 is vacuumized to allow the accommodating mechanism 1 in a negative pressure state again. When the fifth pressing rod 10 drives the seal 16 to press towards the case 16, the inner chamber of the accommodating mechanism 1 is switched from the negative pressure state to the atmospheric pressure state, such that the fifth pressing rod 10 with atmospheric pressure can press the seal 15 towards the bottom of the case 16. When the seal 15 is located at the third depth of the case 16, the fifth cover 11, the fifth pressing rod 10 and the sixth cover 13 move in the direction away from the case 16, and the negative-pressure packaging of aluminum electrolytic capacitor is completed, in which the aluminum electrolytic capacitor is in negative pressure state.

In an embodiment, step (S600) further includes the following steps.

(S700) A to-be-sealed portion of the case 16 is tightened, such that a diameter of the sealed section reduces, enhancing the airtightness between the seal 15 and the case 16.

Mentioned above are merely preferred embodiments of this disclosure, and are not intended to limit the scope of the present disclosure. It should be understood that changes, modifications and replacements made by those killed in the art without departing from the spirit of this disclosure should fall within the scope of the present disclosure defined by the appended claims.

What is claimed is:

1. A negative-pressure packaging method for an aluminum electrolytic capacitor, comprising:
   (S100) penetratedly arranging a capacitor element in a seal;
   (S200) placing the capacitor element, the seal and a case at an inner chamber of an accommodating mechanism; and sealing the accommodating mechanism;
   (S300) vacuumizing the accommodating mechanism to allow the inner chamber to be in a negative pressure state;
   (S400) packaging the seal and the case, such that the seal is located at a first depth of the case; and
   (S500) subjecting the seal and the case to pressing to allow the seal to be located at a second depth of the case, wherein the second depth is closer to a bottom of the case with respect to the first depth.

2. The negative-pressure packaging method of claim 1, wherein step (S200) comprises:
   (S210) placing the capacitor element, the seal and the case at the inner chamber of the accommodating mechanism, wherein the accommodating mechanism has a first open end and a second open end opposite to the first open end; and
   (S220) moving a first cover towards the first open end to seal an opening at the first open end; and moving a second cover towards the second open end to seal an opening at the second open end, such that the accommodating mechanism is sealed.

3. The negative-pressure packaging method of claim 2, wherein step (S400) comprises:
   (S410) penetratedly arranging a first pressing rod in the first cover; and driving, by the first pressing rod, the seal to press towards the case; and
   (S420) penetratedly arranging a second pressing rod in the second cover; and driving, by the second pressing rod, the case to press towards the seal to allow the seal to be located at the first depth of the case.

4. The negative-pressure packaging method of claim 3, wherein step (S410) comprises:
(S411) penetratedly arranging the first pressing rod in the first cover; and driving, by the first pressing rod, the seal to move towards the case to seal the case;
(S412) switching the negative pressure state of the inner chamber of the accommodating mechanism to an atmospheric pressure state; and
(S413) applying, by the first pressing rod, a force towards the bottom of the case to the seal to drive the seal to be located at the first depth of the case.

5. The negative-pressure packaging method of claim 3, further comprising:
(S501) before step (S500), when the seal is located at the first depth of the case, moving the first pressing rod and the first cover in a direction away from the seal; and moving the second pressing rod and the second cover in a direction away from the case; and
(S502) transporting the accommodating mechanism to a next pressing position.

6. The negative-pressure packaging method of claim 2, wherein step (S500) comprises:
(S510) sealing the opening at the first open end of the accommodating mechanism with a third cover, and sealing the opening at the second open end of the accommodating mechanism with a fourth cover, such that the accommodating mechanism is sealed;
(S520) penetratedly arranging a first pressing rod in the third cover; and driving, by the first pressing rod, the seal to press towards the case; and
(S530) penetratedly arranging a second pressing rod in the fourth cover; and driving, by the second pressing rod, the case to press towards the seal to locate the seal at the second depth of the case.

7. The negative-pressure packaging method of claim 6, wherein step (S520) further comprises:
switching the negative pressure state of the inner chamber of the accommodating mechanism to an atmospheric pressure state.

8. The negative-pressure packaging method of claim 2, wherein step (S500) further comprises:
(S600) subjecting the seal and the case to another pressing to locate the seal at a third depth of the case, wherein the third depth is closer to the bottom of the case with respect to the second depth.

9. The negative-pressure packaging method of claim 8, wherein step (S600) comprises:
(S610) sealing the opening at the first open end of the accommodating mechanism with a third cover, and sealing the opening at the second open end of the accommodating mechanism with a fourth cover, such that the accommodating mechanism is sealed;
(S620) penetratedly arranging a first pressing rod in the third cover; and driving, by the first pressing rod, the seal to press towards the case; and
(S630) penetratedly arranging a second pressing rod in the fourth cover; and driving, by the second pressing rod, the case to press towards the seal to locate the seal at the third depth of the case.

10. The negative-pressure packaging method of claim 8, wherein step (S600) further comprises:
performing tightening surrounding a to-be-sealed portion of the case.

* * * * *